Figure 1:
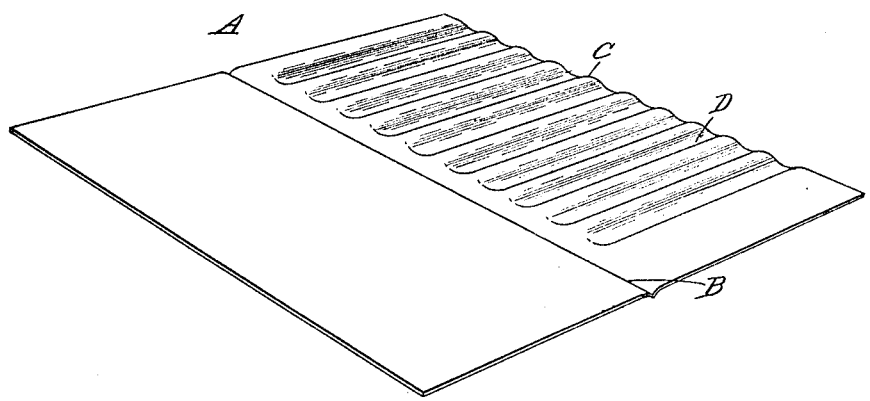

A. McCULLOUGH.
RAZOR BLADE WIPER.
APPLICATION FILED MAY 20, 1918.

1,317,088.

Patented Sept. 23, 1919.

Witnesses
F. C. Gibson.
T. Hough

Inventor
Archie McCullough.

By Victor J. Evans
Attorney

UNITED STATES PATENT OFFICE.

ARCHIE McCULLOUGH, OF BELLAIRE, KANSAS.

RAZOR-BLADE WIPER.

1,317,088.     Specification of Letters Patent.     Patented Sept. 23, 1919.

Application filed May 20, 1918. Serial No. 235,453.

*To all whom it may concern:*

Be it known that I, ARCHIE McCULLOUGH, a citizen of the United States, residing at Bellaire, in the county of Smith and State of Kansas, have invented new and useful Improvements in Razor-Blade Wipers, of which the following is a specification.

This invention relates to a wiper for razor blades, and the primary object of the invention is to provide a device of this character which consists of a single sheet of material which is so creased and corrugated that should the wiper when in use be knocked from a support, it will automatically fold, and confine the lather between the plain and corrugated portion of the sheet, thus preventing the lather from coming in contact with the surface upon which the wiper has dropped.

Another object of the invention is to so corrugate the wiper upon one side of the creased line therein, that the corrugations form a row of channels for the reception of the lather removed from the razor blade thus enabling the wiper to be placed upon a highly polished surface without likelihood of the lather which soaks through the walls of the channels injuring the surface of the support upon which the wiper rests.

With these and other objects in view the invention resides in the novel construction of the wiper hereinafter described and claimed.

The preferred embodiment of the invention has been illustrated in the accompanying drawing, although no restriction is necessarily made to the precise details of construction therein shown, as changes, and alterations within the scope of the claim may be resorted to if desired.

Like characters of reference denote corresponding parts throughout the various views in the drawing in which:—

The figure is a perspective view of the preferred form of the invention.

Referring now to the drawing in detail the letter A designates a razor blade wiper constructed in accordance with the invention.

The improved wiper comprises a rectangular sheet of material such as paper or the like and is provided between its ends with a transversely extending crease line B on which the wiper is adapted to be folded for a purpose which will hereinafter appear.

The wiper A is corrugated, as at C to provide the wiper with a transversely extending row of vertically arranged grooves D which are adapted to receive therein the lather from the razor blade when the wiper is in use. The corrugated portion of the sheet of material is arranged parallel with and adjacent to the crease line B and is of less area than the area of the plain portion of the sheet of material comprising the wiper.

Through the provision of the corrugations in the wiper A, the walls of the grooves D prevent the lather which has been removed from the razor blade from coming in contact with the surface on which the wiper is placed, so that if the surface has a highly polished finish it will not be marred or marked should the lather penetrate the wiper.

Through the provision of the crease line D on which the wiper A is folded it will be obvious that should the wiper when in use be accidentally knocked from a support the wiper will automatically fold and prevent the lather which has accumulated thereon from coming in contact with the surface upon which the wiper may fall.

From the foregoing description taken in connection with the accompanying drawing, it is apparent that a simple and inexpensive device has been provided which is highly efficient for the purpose made.

Having thus described the invention what is claimed is:—

A razor blade wiper comprising a sheet of material having a corrugated portion and a plain portion of greater area than the area of the corrugated portion, and a crease line in the plain portion of said sheet upon which said sheet is adapted to be folded to permit the plain portion and the corrugated portion of said sheet to contact with each other should the sheet be dropped while in use.

In testimony whereof I affix my signature.

ARCHIE McCULLOUGH.

Copies of this patent may be obtained for five cents each, by addressing the "Commissioner of Patents, Washington, D. C."